May 15, 1962   R. W. BRUNDAGE   3,034,448
HYDRAULIC PUMP

Filed May 19, 1959   2 Sheets-Sheet 1

*INVENTOR.*
ROBERT W. BRUNDAGE
BY
Alfred C. Body
ATTORNEY

May 15, 1962 R. W. BRUNDAGE 3,034,448
HYDRAULIC PUMP
Filed May 19, 1959 2 Sheets-Sheet 2
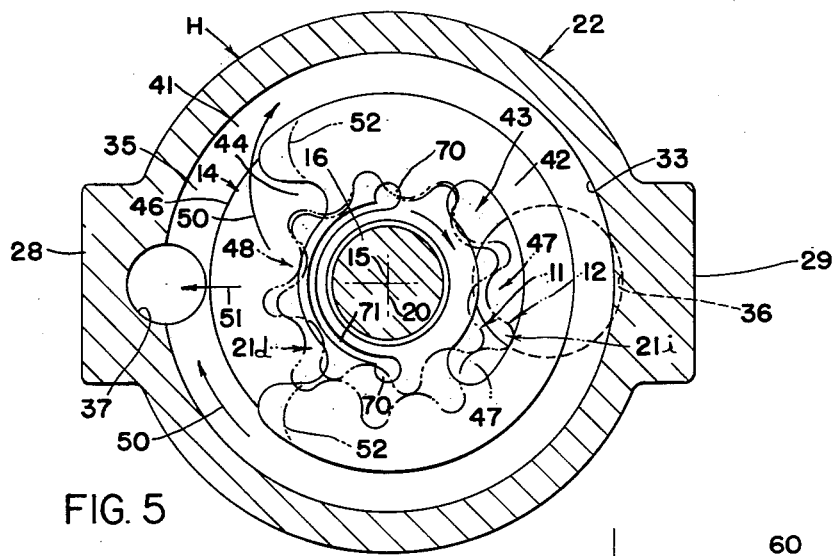
FIG. 5
FIG. 6
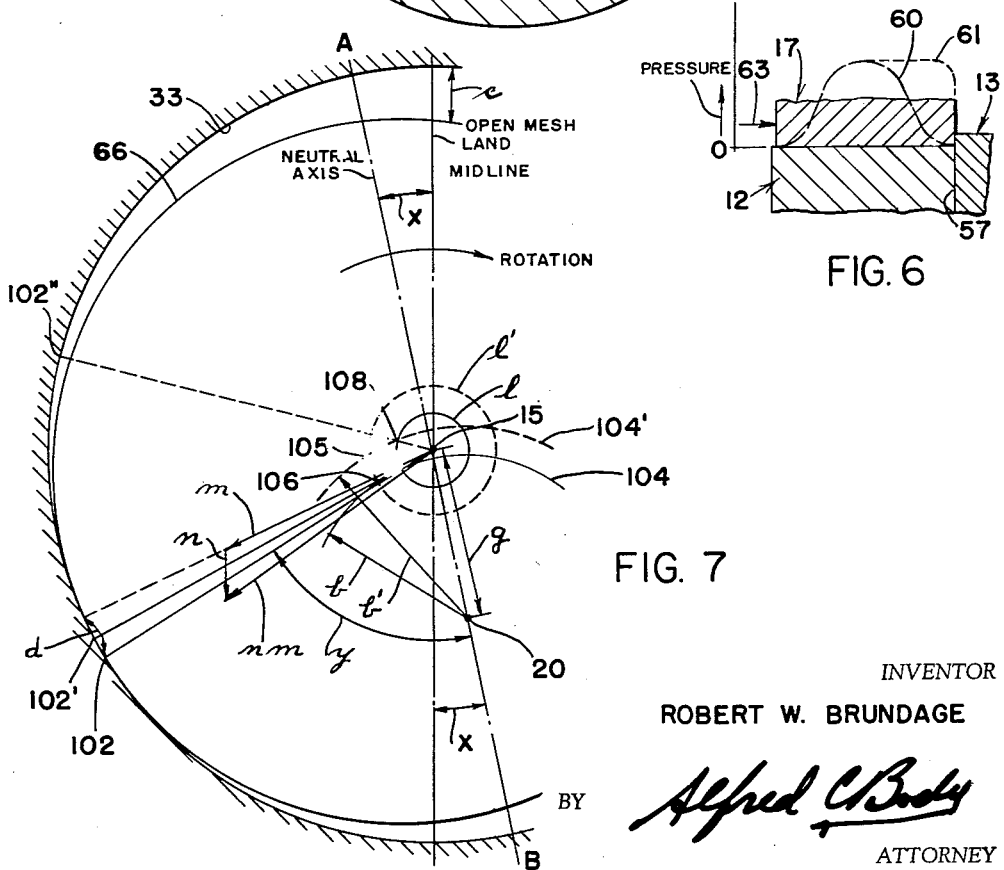
FIG. 7
INVENTOR
ROBERT W. BRUNDAGE
BY Alfred C. Body
ATTORNEY

United States Patent Office 3,034,448
Patented May 15, 1962

3,034,448
HYDRAULIC PUMP
Robert W. Brundage, Willoughby Lake, Ohio
(2809 Wakonda Drive, St. Louis 21, Mo.)
Filed May 19, 1959, Ser. No. 814,320
11 Claims. (Cl. 103—126)

This invention pertains to the art of hydraulic pumps or motors, and more particularly to a hydraulic pump or motor of the positive displacement type.

The invention is particularly applicable to what is generally known as internal gear-type pumps and will be described with particular reference thereto, although it will be appreciated that the invention in some of its aspects has broader applications, and in many instances may be applied to internal gear-type motors or to vane or rotating cylinder type hydraulic pumps or motors or, insofar as the lubrication of sleeve type bearings is concerned, to external type gear pumps.

Furthermore, the present invention is particularly applicable to hydraulic pumps or motors operable at what may be termed very high hydraulic pressures; that is to say, above 1,000 pounds per square inch and oftentimes approaching or exceeding 4,000 pounds per square inch. At such pressures, constructions and expedients usable at the lower pressures are often unsatisfactory and inapplicable to the problems where the higher pressures are encountered.

Internal gear-type hydraulic pumps are normally comprised of an internally toothed and an externally toothed gear members rotatable on spaced axes in a housing with the teeth of the gears in sliding, sealing engagement. The externally toothed gear is supported on a shaft rotatably mounted in the housing. The internally toothed gear in turn is mounted for rotation on an axis spaced from that of the shaft by means of an eccentric bearing ring having eccentric inner and outer surfaces, which ring is in turn supported within the housing. Sealing members engage the axial faces of the gear members so that when the gear members rotate, they will define a plurality of closed chambers revolving about the axis and progressively increasing to a point of maximum volume which corresponds to the point of open mesh of the gears and then to a point of minimum volume which corresponds to the point of closed mesh of the gears. Normally, the chambers which are decreasing in volume communicate with a discharge port and are at high hydraulic pressures while the chambers which are increasing in volume communicate with an inlet port and are at relatively low pressures. These high hydraulic pressures are unsymmetrical in the pump and exert large unsymmetrical radial and axial forces on the gears, sealing members, and bearings which create problems with which the present invention primarily deals.

One of such problems has been to hold the gear teeth at open mesh in sealing engagement. At open mesh, the adjacent chambers have the full pressure differential therebetween and if the teeth separating these chambers are not in sealing engagement, substantial amounts of leakage can occur.

My co-pending application, Serial No. 682,501, suggests one solution to this problem, namely, of loosely positioning the eccentric bearing ring in the housing cavity for limited radial movement and then providing a projection on the outer surface of the bearing ring to give a single point of engagement between the bearing ring and the housing. This point is so located relative to the line of action of the resultant force exerted by the high pressures in the high pressure chambers on the internally toothed gear that the force creates a force couple or turning moment to pivot the bearing ring and internally toothed gear about the point in a direction to exert a "closing force" on the teeth of the gears at open mesh in an amount proportional to the forces tending to separate them. The teeth remain in engagement and wear of the gear teeth is automatically taken up. By "resultant force" is meant the vector sum of all the forces created by the high pressures on the particular part of the pump being discussed and the "line of action" of such force refers to its vectorial direction.

Such projection functioned well at the lower pump pressures. As pressures increased, however, to withstand the unit pressure loading on the projection, it became necessary to make the projection in the form of an axially extending ridge and then to assure line contact, the housing surface had to be machined to concentricity. Even so, the unit loading on the materials can often exceed the ultimate strength of the materials. Additionally forming the projection is expensive.

The present invention overcomes these problems by making both the housing cavity surface and the outer bearing ring surface cylindrical but with a predetermined clearance therebetween and then so predetermining the gear eccentricity and bearing member eccentricity in relation to the clearance that the geometry results in the surfaces being in contact and tangent at a point located opposite to the direction of rotation from the line of action of the resultant high pressure chamber force such that the desired closing force is produced.

The line of action of the resultant force may be considered as extending radially outwardly on the high pressure chamber side of the shaft midway between the line-of-movement ends of all the high pressure chambers, which ends are constantly shifting in the line-of-movement direction as, for example, either a chamber at inlet pressure passes a land and its entire line-of-movement width instantaneously comes into communication with the discharge manifold, or a chamber at discharge pressure passes a land and its entire line-of-movement width instantaneously communicates with the inlet manifolds and thus loses its discharge pressure. The line of action of this resultant force thus swings or oscillates continuously back and forth on either side of the perpendicular from the land midline. It is essential in accordance with the invention that the point of tangency between the housing cavity and bearing ring surfaces be located opposite to the direction of rotation from the maximum swing of this line of action opposite to the direction of rotation.

In accordance with the invention, the amount of the shift of this line of action is lessened by providing a pair of balancing ports intercommunicated by a passage having a predetermined resistance to the flow of fluid between the ports which ports communicate the chambers when closed by a land. Such limited intercommunication results in the intercommunicated chambers being held at approximately the same pressure, somewhere between inlet and discharge pressure.

The pivoted bearing ring arrangement works well for low rotational speeds. However, as the speed of rotation is increased and with the teeth at open mesh always in pressure engagement, slight inaccuracies of the gear tooth shape become a predominant factor and a chatter or noise results.

The present invention overcomes this problem by arranging the lands of the pump so as to create "trapping" in the pumping chambers at open mesh.

By "trapping" is meant the result of a discharge passage from a decreasing volume chamber being closed, at least momentarily, so that the fluid in the chamber cannot flow therefrom. The fluid being non-compressible can reach very high fluid pressures in a very short arc of movement of the chamber. This trapping pressure creates an additional force in the pump opposing the "closing force" and opens the gear teeth at open mesh to allow the trapped fluid to escape to the adjacent low pressure chamber and prevent further rise in the trapping pressure.

The amount of "trapping" is adjusted in relation to the inherent or built in pump leakage so that the teeth do not open until the pump is operating at least at speeds intermediate its minimum and maximum operating speeds. As the leakage resulting from the escape of the trapped fluid only comes at intermediate pump speeds and above where a large volume of fluid is being pumped, it forms a small percentage of the total volume and is not objectionable.

The balancing ports also serve another very important function when the lands are arranged to create "trapping." Thus, in a pump having no internal leakages, the trapping pressures reached are independent of the speed of rotation and the closing force on the pivoted bearing rings would always be less than the opening force of the trapped fluid. Because of inherent pump leakages, this result is not reached until the speed of the pump is increased to some intermediate speed dependent on the amount of leakage. Inasmuch as the internal leakages will vary from one pump to the next, it would be impossible to predict accurately the speed at which the trapping fluids would overcome the closing forces on the gear teeth. The balancing ports, however, are arranged to provide a pump leakage substantially greater than the maximum inherent leakage of the worst pump so that the actual speed at which the opening force of the trapped fluid would exceed the closing force of the pivoted beearing ring will be relatively uniform from one pump to the next.

The result is that a closing force on the gear teeth at open mesh is produced proportional to the pump output pressure and an opening force counteracting this closing force is produced proportional to the speed of pump rotation.

The principal object of the invention is the provision of a new and improved hydraulic pump which is simple in construction, which is economical to manufacture, and which is capable of pumping high fluid pressures at high mechanical and volumetric efficiencies at all rotational speeds.

Another object of the invention is the provision of a new and improved hydraulic pump which will have long life and will operate at a low noise level.

Another object of the invention is the provision of a new and improved hydraulic pump or motor of the internal gear type so arranged as to exert a closing force on the gear teeth at open mesh proportional to the pressure and an opening force on the gear teeth at open mesh proportional to the rotational speed.

Another object of the invention is the provision of a new and improved hydraulic pump of the general type described wherein the eccentric bearing ring is loosely mounted in the housing and its eccentricity, the spacing of the gear axis, and the location of the lands are also interrelated as to produce a closing force on the gear teeth at open mesh directly proportional to a function of the pump discharge pressure in inversely proportion to a function of the pump rotational speed.

The invention may take physical form in certain parts and arrangements of parts, a preferred embodiment of which will be described in detail in this specification and illustrated in the accompanying drawing which is a part hereof and wherein:

FIGURE 5 is a cross-sectional view of FIGURE 1 and turned through an angle of 90° taken approximately on the line 5—5 thereof with the gear teeth being superimposed thereon to show the relationship of the gear teeth to the inlet and outlet ports;

Figure 1:
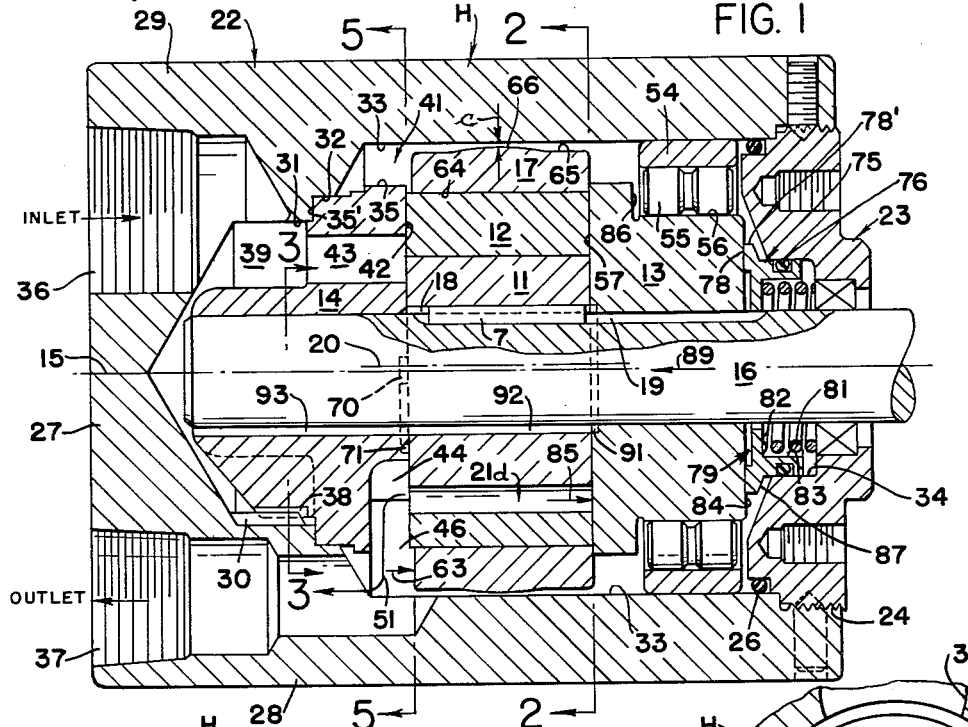
FIGURE 1 is a side cross sectional view of a hydraulic pump illustrating a preferred embodiment of the invention, the section being taken approximately on the line 1—1 of FIGURE 2.
Figures 2, 3, 4:
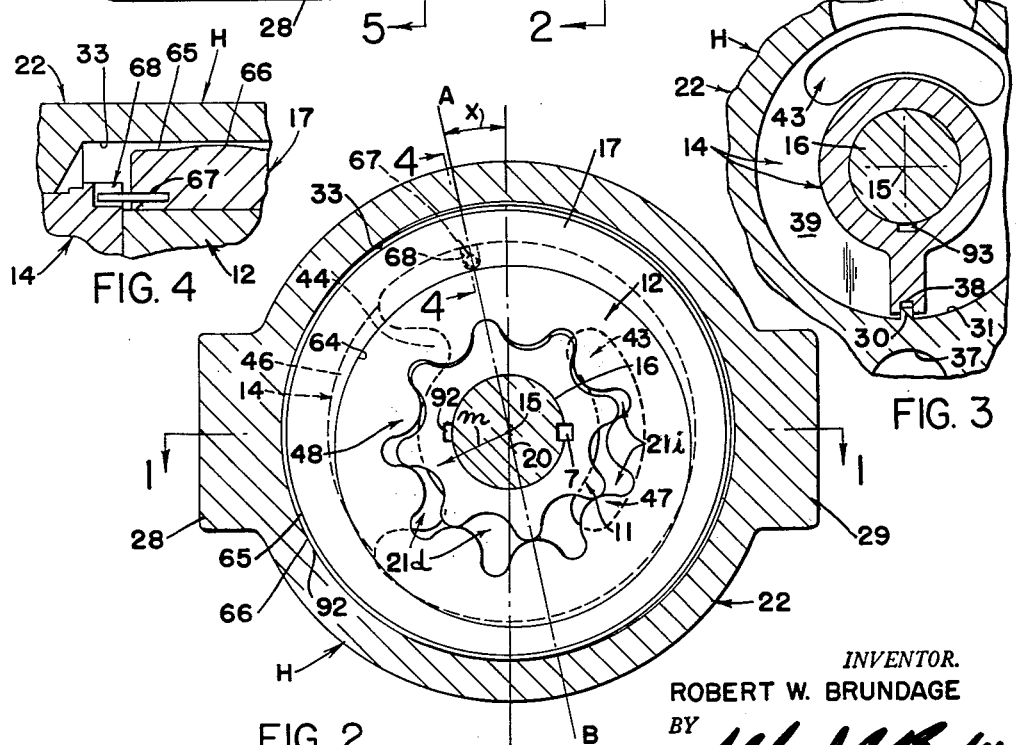
FIGURE 2 is a cross-sectional view of FIGURE 1 taken approximately on the line 2—2 thereof and turned through an angle of 90°.
FIGURE 3 is a fragmentary cross-sectional view of FIGURE 1 taken approximately on the line 3—3 thereof.
FIGURE 4 is a fragmentary cross-sectional view of FIGURE 2 taken approximately on the line 4—4 thereof.

FIGURE 6 is a fragmentary view of FIGURE 1 showing the pressure characteristics of fluid film lubrication obtained between the eccentric ring member and internally toothed gear; and FIGURE 7 is a line diagram with the pump clearances and eccentricities greatly exaggerated and showing the relationship of the clearances between the ring bearing and the housing and the gear and ring bearing eccentricities.

Referring now to the drawings wherein the showings are for the purposes of illustrating a preferred embodiment of the invention only and not for the purposes of limiting same, the figures show a hydraulic pump comprised of a housing H having an internal pumping cavity in which are mounted a plurality of pumping members defining a plurality of closed chambers which progressively increase and decrease in volume as the members move relative to each other. While such members may take a number of conventional forms, such as rotating cylinders with axially reciprocating pistons, or rotating vanes, or the like, in the embodiment of the invention shown, they comprise generally an externally toothed gear member 11, an internally toothed gear member 12, sealing and manifold members 13, 14 one engaging the right and the other the left hand axial faces of the gears 11, 12 respectively.

Pumping Members

The gear member 11 is supported for rotation on the axis 15 of a shaft 16 and keyed thereto by a key 7 fitting into keyways 18, 19 on the gear 11 and shaft 16 respectively. The internally toothed gear member 12 is supported for rotation about an axis 20 spaced from the axis 15 in a bearing member 17 which, as will appear, is loosely mounted within the housing cavity. The spacing of these axes will be referred to hereinafter as the "gear eccentricity." The gear member 12 has one tooth more than that of the gear member 11 and these teeth are in sliding, sealing engagement so that as the gear members 11, 12 rotate they, along with the sealing and manifold members 13, 14, define a plurality of closed pumping chambers $21i$ and $21d$ which revolve on a closed path of movement and progressively increase in volume from a point $a$ of minimum volume to a point $b$ of maximum volume and then decrease to the point of minimum volume $a$. The points $a$ and $b$ define what may be termed a neutral plane A, B through the two axes of rotation and it will be further noted that the gear teeth at the point A are in what may be termed "closed mesh" and at the point B at "open mesh."

Housing

The housing H in the embodiment shown is formed in two parts, namely, a main part 23 generally in the shape of a cup, and a closure part 23 removably positioned in the open end of the cup 22 by any suitable means, but preferably by means of threads 24. An O-ring 26 between opposed surfaces of the two parts and on the cavity side of the threads 24 provides a seal to prevent leakage of the hydraulic fluids longitudinally past the threads 24.

The main part 22 includes a base 27 and a side wall having a pair of external, diametrically opposed longitudinally extending ribs 28, 29. The side wall defines a plurality of inwardly facing generally cylindrical surfaces 31, 32, 33 which are progressively larger in diameter reading from left to right. In a like manner, the closure part 23 has a cylindrical surface 34 which slidingly support a sealing ring 75.

In the preferred embodiment, both of the parts 22, 23 are preferably made from aluminum and by virtue of the symmetry thereof can be formed from impact extruded aluminum. Furthermore, because of the design of the pump, as will appear, the diameters and surfaces of the cylindrical surfaces 31, 33, and 34 can have rather rough tolerances, and a rough finish as may be characteristic of impact extrusion tools. Surface 32 and the shoulder between surface 31 and 32 are accurately machined before assembly of the pump. It is to be further noted that the threads 24 must have a slight clearance for ready assembly. Such threads under the high pressure forces, which will be developed on the inside of the housing H permit the closure part 23 to cock slightly with reference to the main part 22. However, in the design of the pump shown, this is not detrimental.

The surface 31, at the time of extrusion, has a pair of diametrically-opposite, axially-extending lugs 30 aligned with the ribs 28, 29. After the extrusion operation, inlet opening 36 is drilled through the base 27 aligned with rib 29 in such a manner as to intersect with surface 31 and remove one of these lugs. However, it will be noted that at the time of the impact extrusion operation, the housing part 22 is completed symmetrical. Outlet opening 37 is drilled into the base 27 aligned with the rib 28 of a diameter and so spaced radially as to clear the surface 31 and intersect with the surface 33.

*Manifold Member*

The manifold member 14 is fixedly mounted in the housing in any suitable manner, but in the embodiment shown has a cylindrical surface 35 fitting within the surface 32 and an axially facing surface 35' bearing against the shoulder between the surfaces 32 and 31.

The shaft 16 extends into and is rotatably supported in the member 14, it being noted that by virtue of the design features of the pump, that a simple inexpensive sleeve type bearing may be employed.

The manifold member 14 defines, along with the cylindrical surface 31, a housing cavity 39 communicating with an inlet opening 36. This cavity 39 is at inlet pressure.

The manifold member surface 35 extends beyond the cylindrical surface 32 and defines with the cylindrical surface 33 and the left hand axial end of the bearing member 17, a housing cavity 41 generally in the shape of a ring which communicates with an outlet opening 37.

The manifold member 14 has on its right hand axial end a surface 42 in sealing engagement with the left hand axial face of the gears 11, 12. An inlet manifold port 43 extending in an arcuate direction in the path of movement of the pumping chambers is formed in the sealing face 42 and extends axially through the manifold member 14 to communicate with the cavity 39.

Additionally, an outlet manifold port 44 is formed in the sealing surface 42 diametrically opposite from the inlet manifold 43 which also extends in an arcuate direction in the line of movement of the pumping chambers. A passage 46 which in this instance simply forms a radial extension of the manifold 44 communicates the port 44 with the housing cavity 41. This cavity 41 houses both gears 11, 12, the sealing member 13 and the bearing ring 17 and as an important part of the invention, is at discharge pressure.

The formation of the manifold ports 43, 44 in the surface 42 leaves portions of the sealing surface between the arcuate ends of the manifold and in the chamber path of movement which forms open mesh land 47 and closed mesh land 48, each having a line of movement width slightly greater than (by about 10°) the line of movement width of one pumping chamber, that is to say, the line of movement width between the points of contact of adjacent teeth on one of the gears with adjacent teeth on the other of the gears.

It will be appreciated that as the gears revolve, there may be a slight variation in the line of width movement of each chamber. The line of movement width referred to is that width existent at the instant when a chamber is adjacent a land.

In the event that a ported plate is employed, as is shown in my co-pending application, Serial No. 656,117, filed October 1, 1956, now Patent No. 3,007,418, then obviously the line of movement width will be considerably reduced and would be the arcuate width of the opening in the ported plate considered in the path of movement.

In the embodiment of the invention shown, the manifold ports 43, 44 and the lands 47, 48 are symmetrically arranged relative to the inlet and outlet openings 36, 37 and are held in this relationship by means of an axially extending groove 38 which fits over and engages the lug 30 on the cylindrical surface 31.

The sealing surface 42 also has a pair of diametrically opposite balancing ports 70, each located on the land mid line and spaced from the axis 15 so that for the instant when a chamber is adjacent to and thus closed by a land, the ports will be open to such chamber. An arcuate groove 71, also in the sealing surface, intercommunicates the trapping ports 70 and in conjunction with the face of the gear 11 forms a leakage passage between such ports of a limited but predetermined leakage resistance. The function of these ports and leakage groove will be described more fully hereinafter.

With the arrangement shown, and with the clockwise rotation of the gears 11, 12 shown in FIGURE 5, the hydraulic fluids leaving the decreasing volume chambers 21*i* have a substantial circumferential velocity component with the result that some of the fluid flows circumferentially through the ring-shaped cavity 41, as indicated by the flow line 50, to reach the outlet opening 37 giving a cooling action to the portions of the pump members adjacent to the cavity 41. The remainder of the hydraulic fluid flows directly outwardly through the outlet opening 37, as indicated by the flow line 51. This flow of fluid also has another important function, as will appear hereinafter.

If it is desired to increase the proportion of the fluid flowing in the flow path 50, it is possible to shape the sides defining the passage 46, as indicated by the dotted line 52.

*Sealing Member*

The sealing member 13 is mounted on the shaft 16 and desirably forms an integral part thereof. It may be welded thereto, but in the preferred embodiment, has an interference fit with the shaft.

The sealing member 13 and shaft 16 are mounted for limited axial movement and for rotation within the housing H by any suitable means, such as a roller bearing consisting of an outer race 54 press-fitted into the housing H and a plurality of circumferentially spaced cylindrical rollers 55 engaging an outer cylindrical surface 56 on the sealing member 13.

As is taught in my co-pending application, Serial No. 613,235, the plane of the bearing is spaced a predetermined distance from the axial center of the gears whereby the force moments of the high pressures on the member 13 are approximately equal, opposite, and thus generally in balance.

The sealing member 13 has a surface 57 which extends radially outwardly beyond the outer surface of the ring gear and is in sealing engagement with the right hand axial faces of the gears 11, 12 to close the right axial end of the chambers 21. The high pressure fluid in the high pressure chambers exerts a radially offset axial force indicated by the vector 85 to the right on the member 13, which force is opposed by means of the discharge pressure in the cavity 41 exerting an axial force indicated by the vector 89 on the surfaces 84 and 86 of the sealing member 13 facing in an axial direction opposite to that of the surface 57.

The size of the force 89 is equal to the product of the hydraulic pressure and the sum of the area of the surfaces 84 and 86 exposed to such pressures. Preferably, the size of the force 89 is approximately 14% greater than the size of the force 85.

The area of the surface 84 exposed to the high pressures in the housing cavity 41 is limited or restricted by means of the sealing ring 75.

*Sealing Ring*

The sealing ring 75 is generally in the shape of a sleeve and is axially slidable in a sealed relationship with the housing cavity defined by the cylindrical surface 34 by means of an O-ring 76 mounted in a groove on the outer surface of the ring. The ring 75 surrounds the shaft 16 and has a left hand axially facing surface 78 formed on a radially outwardly extending flange 78' in pressure sealing relationship with the right hand axially facing surface 84 of the sealing member 13. The ring 75 thus defines an internal cavity 79 which is at inlet pump pressure, it being noted that the cavity 79 is communicated with the inlet through the keyway 19, a small counterbore 91 in the surface 57, an opposite keyway 92 in the gear 11, and a groove or passage 93 in the manifold member 14.

A helical compression spring 81 between the base of the housing part 23 and a base 82 of a counterbore 83 in the sealing ring 75 biases the surfaces 78, 84 into a limited pressure engagement. It is to be noted that this spring also presses the sealing member 13 into engagement with the axial faces of the gear 11, 12 and presses the gear 11, 12 into pressure engagement with the sealing surface of the manifold member 14. The spring 81 is relatively weak and simply provides an initial force to maintain the various surfaces in pressure engagement when the pump is not operating or when it is started into operation. The principal sealing force is the hydraulically produced force above referred to.

The surface 78 engaging the surface 84 seals the high pressure in the pump cavity 41 from the inlet and as described in my co-pending application, Serial No. 613,235, the ring 75 has an outwardly extending flange having a right-hand axially facing surface 87 on the flange 78' exposed to this hydraulic pressure, the area of which surface 87 is so proportioned that the force produced between the surfaces 78 and 84 is just equal to the force of the pump discharge pressure tending to separate these surfaces.

*Eccentric Bearing Member*

The eccentric bearing member 17, as an important feature of the present invention, is radially movable within limits within the pump housing H.

Thus, the bearing member 17 is in the shape of a ring having an inner cylindrical surface 64 in which the internally toothed gear 12 is rotatably supported and thus has an axis corresponding to the axis 20.

The bearing member 17 also has an outer generally cylindrical surface 65 having an axis spaced from the axis 20, the spacing being hereinafter referred to as the bearing member eccentricity, which eccentricity is generally close to, but not necessarily equal to, the gear eccentricity. The relationship between these eccentricities, however, is important insofar as the present invention is concerned. It is to be noted that the plane of the axes of the surfaces 64, 65 determine the neutral axis A, B and as the bearing ring is turned within the housing, the neutral axis will be likewise turned.

The bearing member 17 is held against rotation in a manner such as to permit a limited degree of radial and axial movement. Thus in the embodiment of the invention shown, a pin 67 extends axially from the left hand side of the bearing member 17 into a slot 68 in the right hand face of the manifold member 14. This slot has a circumferential width somewhat greater than the diameter of the pin and a radial and axial depth such that the pin 67 is loosely engaged therein.

The pin 67 is positioned on the neutral axis and on the closed mesh side of the bearing member 17, while the slot 68 is spaced from the midline of the open mesh land 47 by an angle $x$. This angle $x$ will be referred to as the trapping angle and as used in this specification and claims is always measured from the land midline to the neutral axis opposite to the direction of rotation. The purpose and size of this angle will be described in greater detail hereinafter.

The surface 65 has a spherical bead 66 extending around its entire outer periphery, which shape assists in the member 17 aligning itself with the surface 33. This surface thus does not need to be reamed. The outer diameter of bead 66 is less than the diameter of the surface 33 by a predetermined amount to provide a nominal clearance $c$, hereinafter referred to as the bearing ring clearance. This clearance may vary from .002 to .010 inch maximum. It is obvious that as the bearing member 17 moves radially within the housing H, the clearance will not be uniform around its entire periphery, but will, in fact, vary from zero where the bearing ring contacts the surface 33 to twice the clearance diametrically opposite from the point of contact. In this respect it is to be noted that two circles can only be tangent at one point, which point is on the common line through the centers of curvature. The location of this point forms an important part of the present invention.

Thus in operation, the pumping chambers in communication with the outlet ports are at high fluid pressure. These pressures exert large radially outward forces on the gear 12, and as only one half of the chambers are at the high pressure, the forces are radially unsymmetrical. While these forces are exerted over a generally semicircular arc on the inside of the gear 12, they may for the purposes of analysis be instantaneously integrated into one resultant radial force, indicated by the vector $m$, having a line of action on the radial line midway between the line of movement ends of the high pressure chambers, and on the high pressure chamber side of the shaft. These ends are constantly shifting or oscillating when, for example, either a chamber at inlet pressure passes a land and its entire line of movement width instantaneously comes into communication with the outlet manifold, or a chamber at discharge pressure passes the diametrically opposite land and its entire line of movement width instantaneously communicates with the inlet manifold and thus loses its discharge pressure. The line of action of this resultant force thus swings or oscillates continuously back and forth through a predetermined arc. This radial force urges the gear 12 and the bearing member 17 radially within the housing, and the spherical surface 66 engages the surface 33 at a single point 102, which point is always located on the high pressure side of the shaft (or the land mid line) and with a circumferential location which depends solely on the geometry of the pump members, namely, the bearing member clearance, the gear eccentricity, and the bearing member eccentricity.

In accordance with the invention, these variables are all so proportioned in the design of the pump that the point of contact 102 is so located relative to the maximum swing or oscillation of the force $m$ opposite to the direction of rotation that the gear teeth at open mesh are always biased or urged together, that is to say, a closing force on the gear teeth is produced. As will become obvious, this point 102 must be on the circumferential side of the maximum swing of the force $m$ opposite to the direction of rotation i.e. between the open mesh land and the force.

*Geometry*

FIGURE 7 is a schematic view showing the geometric relationship of the above three-mentioned variables. Thus, in FIGURE 7 the surface 33 has a center or axis 15 corresponding to the axis of the shaft 16. The bearing member 17, if positioned within the housing without the gears 11, 12 would be free to move radially in an amount determined by the clearance $c$ and the center or axis of the surface 66 would have a locus indicated generally by the circle 1, the diameter of which is equal to 2 times c.

The ring gear 12 has an axis 20 spaced from the axis 15 by an amount equal to the gear eccentricity g. This axis 20 is located on the neutral plane A—B determined by the circumferential positioning of the bearing member 17.

When the bearing member 17 is assembled with the gears 11, 12, the center of the surface 66 will move on an arc 104 having a center at the axis 20 and located relative to the axis 15 depending upon the bearing member eccentricity b. The curves 104 and 1 intersect at point 105, the surface 66 will be in contact with the surface 33 at the point 102, which point may be located by drawing a line through the axis 15 and the point of intersection of the curves 104 and 1. It would thus appear that there are two possible points of contact, but because the force m is unsymmetrical, the point of contact 102 will of necessity be on the same side of the land mid lines as the high pressure chambers.

The force m is shown in FIGURE 7 in its maximum swing opposite to the direction of rotation and has a moment arm on the bearing member 17 about the point 102 equal to the perpendicular distance d from the point 102 to the line of action of the force m.

In accordance with the invention, this point 102 is located on the side of the force m opposite to the direction of rotation so that the turning moment of the force acting through the moment arm d rotates the bearing member 17 and thus the gear 12 in a direction such as to bias the open mesh gear teeth into engagement.

The point 102 will hereinafter be referred to as the contact pivot point.

It will be appreciated that the location of the contact pivot point 102 relative to the force m may be readily controlled at the time of manufacture of the pump by varying the angle x or g, b or c.

In FIGURE 7, this is illustrated by increasing the clearance c, in which case the locus of the points of the center of the surface 66 are indicated by the circle 1'. The curve 104 and the curve 1' intersect each other at the point 106 and the common line 107 through the two centers, then gives a point of contact 102' on the surface 33 relatively close to the pivot point contact 102. It will thus be seen that variations in the clearance c have little effect on the location of the contact pivot point. However, if the bearing member eccentricity is increased or decreased so as to be substantially different from the gear eccentricity, then a different result may be expected. Thus, if a bearing member eccentricity b' is selected, the locus of points of the center of the surface 16 will then be on the curve 104'. In such case, the curve 104' and 1' intersect each other at the point 108 resulting in a point of contact 102'' substantially spaced from the desired point of contact 102, and in fact, on the wrong side of the force m.

The contact pivot point 102 is on a line having an angle y from the neutral axis which may be defined by the formula:

$$\cos y = \frac{c^2 + g^2 - b^2}{2cg}$$

In accordance with the invention, the angle y must always be less than the sum of 90° and the trapping angle x.

It will also be seen that as the trapping angle x is increased or decreased by shifting the bearing member 17 relative to the manifold member 14, the contact pivot point 92 may also be moved.

It is to be noted that the use of a bearing member having a substantial clearance from the walls of the pump housing whereby the bearing member 17 may move radially in the housing, is a substantial variation from previous practice. Thus, if previous practices were employed namely wherein the clearance c equals zero, no closing force on the gear teeth at open mesh would result.

Holding the teeth at open mesh in engagement prevented leakage from a high pressure chamber to the adjacent low pressure chamber at open mesh and resulted in a pump having a very high volumetric efficiency particularly at the lower rotational speeds. However, as the speed of rotation of the pump increased, it was found that when the teeth were biased together at open mesh, a noisy operation resulted. Analysis of this problem indicated that very small variations from the ideal tooth contour resulted in a pounding of the gear teeth at open mesh when the teeth were held in pressure engagement.

Further analysis of the problem indicated that as the speed of the pump increased and thus its output volume increased, internal leakages at open mesh past the gear teeth from the high pressure chambers to the low pressure chambers became a smaller and smaller percentage of the total volume output. Accordingly, in accordance with the present invention, means are provided to give an opening force on the gear teeth at open mesh proportional to the speed of rotation. Thus in accordance with the present invention, the neutral axis of the gears is shifted relative to the mid line of the lands opposite to the direction of rotation so that just as the chambers commence to decrease in volume, they will be adjacent a land and thus closed momentarily as they revolve. When a decreasing chamber is closed, trapping results.

The hydraulic fluid in the trapped chamber creates a force indicated generally by the vector n on the ring gear 12 which force is generally parallel to the land mid line in the direction of open mesh. This force n, in conjunction with the force m, has a resultant force nm, which as the size of the force n increases, will have a line of action which approaches the contact point 92 and then extends on the other arcuate side thereof. At this moment, the closing force on the gear teeth at open mesh no longer exists, and the teeth open sufficiently to permit an escape of the trapped fluid and prevent any further increase in the trapping pressure. The invention in effect provides an automatic release valve for this trapped fluid.

It will be further noted that the size of the force n required to move the resultant force nm across the contact pivot point 92 varies with size of force m, i.e., the pump discharge pressure. Thus at low discharge pressures the teeth will open earlier than with high discharge pressures.

It is furthermore to be noted that the interconnected ports 70 provide a leakage path from the chamber where trapping occurs to the diametrically opposite chamber, which is also opposite a land, and in which cavitation is occurring. Thus the trapped fluid can leak from the chamber with the trapping pressure to a chamber at a negative pressure, but in controlled amounts so that the trapping pressures at low rotational speeds where a low volume of trapped fluid is produced will be relieved even though the discharge pressures are high.

Thus in the preferred embodiment of the pump, the opening force resulting from trapping comes into effect only when the pump is rotating at high speed in which event the volume of fluid being pumped is high and the leakage resulting from the trapping is a relatively small percentage of the total volume pumped.

For a fixed land width, the volume of fluid trapped is a function of the trapping angle x and this angle is so selected that the pump leakage due to trapping will be approximately 1 to 2% in excess of the natural pump leakage. The angles selected will to some extent depend upon the quality of the gears, higher quality gears requiring a smaller angle. For gears which have been tested, 8° seems to be the minimum, 20° is the maximum, and 10 to 14° the optimum. In the preferred embodiment of the pump shown, the trapping angle equals 12°.

The length and cross-sectional area of the passage 71 between the balancing ports 70 determines, for a given pump discharge pressure, the speed at which the closing force on the gear teeth are counterbalanced by the trapping pressures. In small pumps the passage 71 may be eliminated entirely, with the normal leakage within the pump depended upon to control the speed at which the gear teeth open. In larger pumps, e.g., one having an output capacity of 15 gallons per minute at 1800 r.p.m. and a ring gear diameter of 2.755 inches, the groove dimensions are .062 inch wide by .062 inch deep by approximately 1 inch long.

The trapping ports 70 and intercommunicating grooves 71 also perform another very important function. As above indicated, the line of action of the force $m$ swings or oscillates generally in equal amounts on both sides of the perpendicular to the land mid line on the high pressure chamber side of the shaft. The balancing ports 70 by interconnecting the chambers just before they either come into communication with the high pressure discharge manifold, or go out of communication with the high pressure discharge manifold permit a fluid flow between these chambers whereby the pressures in the two chambers will tend to equalize at a value somewhere between inlet and discharge pressure.

It will be appreciated that in conventional internal gear-type pumps, as the gear teeth or bearings wear, the clearances at open mesh will normally increase resulting in a decreased pump performance. Using the present invention, however, the gear teeth particularly at the lower pump speeds, are continuously biased together at open mesh with a result that all such wear is taken up at least so long as the closing force on the teeth exist, as determined by the geometry as above described.

The bearing member 17 provides what is known as a sleeve-bearing support for the rotation of the internally toothed gear 12, namely, of two cylindrical surfaces rotating relative to each other one inside the other.

Fluid film support lubrication is maintained between these surfaces. By fluid film support is meant that the pressure developed in the lubricating film between the surfaces due to the relative rotation thereof exerts a radial separating force on the surfaces greater than the forces of the radial load which the bearing must carry.

*Performance*

Pumps constructed in accordance with the present invention have given rather startling performance characteristics.

Thus manufacturers of standard internal gear-type pumps recommend a maximum speed of 1200 r.p.m., a No. 20 minimum viscosity hydraulic oil, and maximum pressures of 1500 pounds per square inch, and these pressures only intermittently. Under these conditions, a volumetric efficiency of 80% and an over-all efficiency of 75% are indicated as typical.

Using a pump constructed in accordance with the present invention, however, and a No. 10 hydraulic oil, a volumetric efficiency of 98%, an an over-all efficiency of 93% are readily obtained at 2,000 pounds per square inch at a speed of 2,000 r.p.m. At 3500 pounds per square inch, volumetric efficiencies of 93% have been obtained, and the pump has operated satisfactorily at 5,000 pounds per square inch without any apparent damage to the bearing surfaces or the gear teeth.

The invention has been described in relation to a pump. Obviously, it is equally applicable to a motor taking into account that if the high pressure chambers remain the same, the direction of rotation will be reversed or if the direction of rotation remains the same, the high pressure pump chambers become low pressure and vice versa.

Generically as applied to a motor or pump the contact point 102 will always be located between the line of action of the high pressure chamber force $m$ and the open mesh land and the open mesh land to produce trapping must close a decreasing volume chamber.

It will thus be seen that an embodiment of the invention has been described which accomplishes all of the objectives heretofore set forth, and others, and provides a hydraulic pump having a maximum of efficiency, a minimum of noise, and a minimum of wear.

The invention has been described with reference to a preferred embodiment. Obviously modifications and alterations will occur to others upon a reading and understanding of this specification, and it is my intention to include all such modifications and alterations insofar as they come within the scope of the present invention.

Having thus described my invention, I claim:

1. In a hydraulic pump comprised of, in combination: a housing having an inwardly facing surface defining a pumping cavity at least portions of which surface are cylindrical; a shaft extending in to said housing and rotatable on the axis of said cylindrical portion; an externally toothed gear supported on said shaft for rotation therewith; an internally toothed gear having teeth in sliding, sealing engagement with said externally toothed gear and rotatable about an axis spaced from said shaft axis by a predetermined gear eccentricity determined by said gear teeth; a bearing ring having a radially inwardly facing cylindrical surface rotatably supporting said internally toothed gear and a radially outwardly facing generally cylindrical outer surface with an axis spaced from the axis of said inwardly facing cylindrical surface by a predetermined bearing ring eccentricity; said gear teeth moving from open to closed mesh as the gears rotate and defining a plurality of revolving progressively increasing and decreasing volume chambers; said gears having a neutral plane passing through the maximum open and maximum closed mesh points of said teeth; a sealing member in sealing engagement with one axial end of said gears; a manifold member in sealing engagement with the other axial end of said gears and having an arcuate inlet and an arcuate outlet port therein opening towards said chambers; a land at each end of the outlet port sealingly separating it from the inlet port, said lands being located one adjacent said maximum closed mesh and the other adjacent said maximum open mesh points of said gears; said chambers each having an opening which moves past said lands and communicates its respective chamber alternately with said ports; the line of movement width of said lands being slightly greater than the line of movement width of the openings from said chambers to said ports, the chambers on one radial side of the lands being at high discharge pressure whereby a resultant radially outward force is exerted on said internally toothed gear on the same side of the plane as the high pressure chambers, the improvement which comprises said bearing ring outer surface having a predetermined clearance from said housing surface and being radially movable in said housing cavity whereby said resultant force moves said bearing ring into engagement with said housing at a single point; said bearing ring eccentricity, said gear eccentricity and said clearance all being so interrelated that said resultant force moves said bearing ring radially into contact with said housing at a contact point located between the maximum open mesh point and the line of action of said force.

2. The improvement of claim 1 wherein the neutral plane of said gears is spaced from the center of said open mesh land in a direction opposite to the direction of rotation by a predetermined angle.

3. The improvement of claim 1 wherein each land has a trapping port of limited line of movement width in the line of movement of said chambers said trapping port being in communication with said openings as they move past said lands and a passage of limited cross sectional area intercommunicates said trapping ports.

4. The improvement of claim 2 wherein each land has a trapping port of limited line of movement width in the line of movement of said chambers said trapping ports being in communication with said openings as said opening move past said lands and a passage of limited cross sectional area intercommunicates said trapping ports.

5. The improvement of claim 1 wherein said clearance is from .002 to .010 inch.

6. The improvement of claim 1 wherein the neutral plane of said gears is so located relative to the center of said open mesh land so as to produce trapping in each chamber as it passes the neutral plane and commences to decrease in volume.

7. The improvement of claim 1 wherein said neutral plane forms an angle of from 2–20° with the center of said open mesh land measured in a direction opposite to the direction of rotation.

8. The improvement of claim 7 wherein said angle is from 10–14 degrees.

9. The improvement of claim 1 wherein a passage of predetermined leakage is provided from a chamber when trapping occurs therein to an area of lower pressure in said pump.

10. The improvement of claim 9 wherein said leakage path is the inherent leakage of said pump.

11. The improvement of claim 6 wherein each of said lands has a port of restricted circumferential width which communicates with each chamber when closed by the respective land and a passage of limited cross sectional area intercommunicates said ports.

References Cited in the file of this patent

UNITED STATES PATENTS

| | | |
|---|---|---|
| 1,442,828 | Rotermund | Jan. 23, 1923 |
| 1,700,818 | Wilsey | Feb. 5, 1929 |
| 1,719,639 | Wilsey | July 2, 1929 |
| 1,719,640 | Wilsey | July 2, 1929 |
| 1,799,237 | Jensen | Aug. 7, 1931 |
| 1,970,146 | Hill | Aug. 14, 1934 |
| 2,076,664 | Nichols | Apr. 13, 1937 |
| 2,132,813 | Wahlmark | Oct. 11, 1938 |
| 2,291,354 | Sibley | July 28, 1942 |
| 2,405,061 | Shaw | July 30, 1946 |
| 2,676,548 | Lauck | Apr. 27, 1954 |
| 2,785,637 | Nubling | Mar. 19, 1957 |
| 2,787,963 | Dolan et al. | Apr. 9, 1957 |
| 2,792,788 | Eames | May 21, 1957 |
| 2,948,229 | Brundage | Aug. 9, 1960 |